United States Patent [19]

Viaud et al.

[11] Patent Number: 5,152,123
[45] Date of Patent: Oct. 6, 1992

[54] INDICATOR SYSTEM FOR ALERTING AN OPERATOR TO THE CONDITION OF A LARGE CYLINDRICAL BALE WRAPPING MECHANISM

[75] Inventors: Jean Viaud, Sarreguemines, France; Henry D. Anstey, Ottumwa, Iowa

[73] Assignee: Deere & Company, Moline, Ill.

[21] Appl. No.: 721,808

[22] Filed: Jun. 26, 1991

Related U.S. Application Data

[62] Division of Ser. No. 457,445, Dec. 27, 1989, abandoned.

[51] Int. Cl.⁵ .............................................. B65B 57/18
[52] U.S. Cl. .................................... 53/508; 53/211;
  53/389.3; 53/587; 83/928; 100/4; 100/99
[58] Field of Search ................. 53/508, 507, 506, 505,
  53/389.3, 587, 211, 528, 430, 118; 100/4, 3, 5,
  99; 56/341, 432, 436; 83/522, 928

[56] References Cited

U.S. PATENT DOCUMENTS

| | | | |
|---|---|---|---|
| 4,554,775 | 11/1985 | Asami et al. | 53/389.3 X |
| 4,563,854 | 1/1986 | Ackermann et al. | 53/389.3 X |
| 4,624,179 | 11/1986 | Yves et al. | 100/4 |
| 4,647,243 | 3/1987 | Koning | 403/61 |
| 4,656,930 | 4/1987 | VanDenBossch et al. | 100/3 |
| 4,674,403 | 6/1987 | Byrant et al. | 100/4 |
| 4,697,402 | 10/1987 | Anstey et al. | 53/506 |
| 4,779,087 | 10/1988 | Ciolli | 340/634 |
| 4,787,193 | 11/1988 | Verhulst et al. | 53/389.3 X |
| 4,855,924 | 8/1989 | Strosser et al. | 364/468 |
| 4,995,216 | 2/1991 | Vansteelant | 53/587 X |

Primary Examiner—James F. Coan

[57] ABSTRACT

A large round baler includes mechanism for optionally wrapping a bale with either twine or a surface wrap material. A wrap control mechanism includes means whereby the wrapping process is initiated in response to a bale reaching a desired diameter within the bale chamber. Various microswitches are strategically mounted so as to be operated by various components of the twine and surface wrap mechanisms and the control mechanism therefor. These switches are integrated into an indicator circuit including indicator devices including various colored lights and a buzzer all of which are caused to operate in various modes to apprise an operator of when the wrapping process is beginning, whether or not twine or surface wrap material is present, when wrapping is complete and when the surface wrap material has been severed.

3 Claims, 8 Drawing Sheets

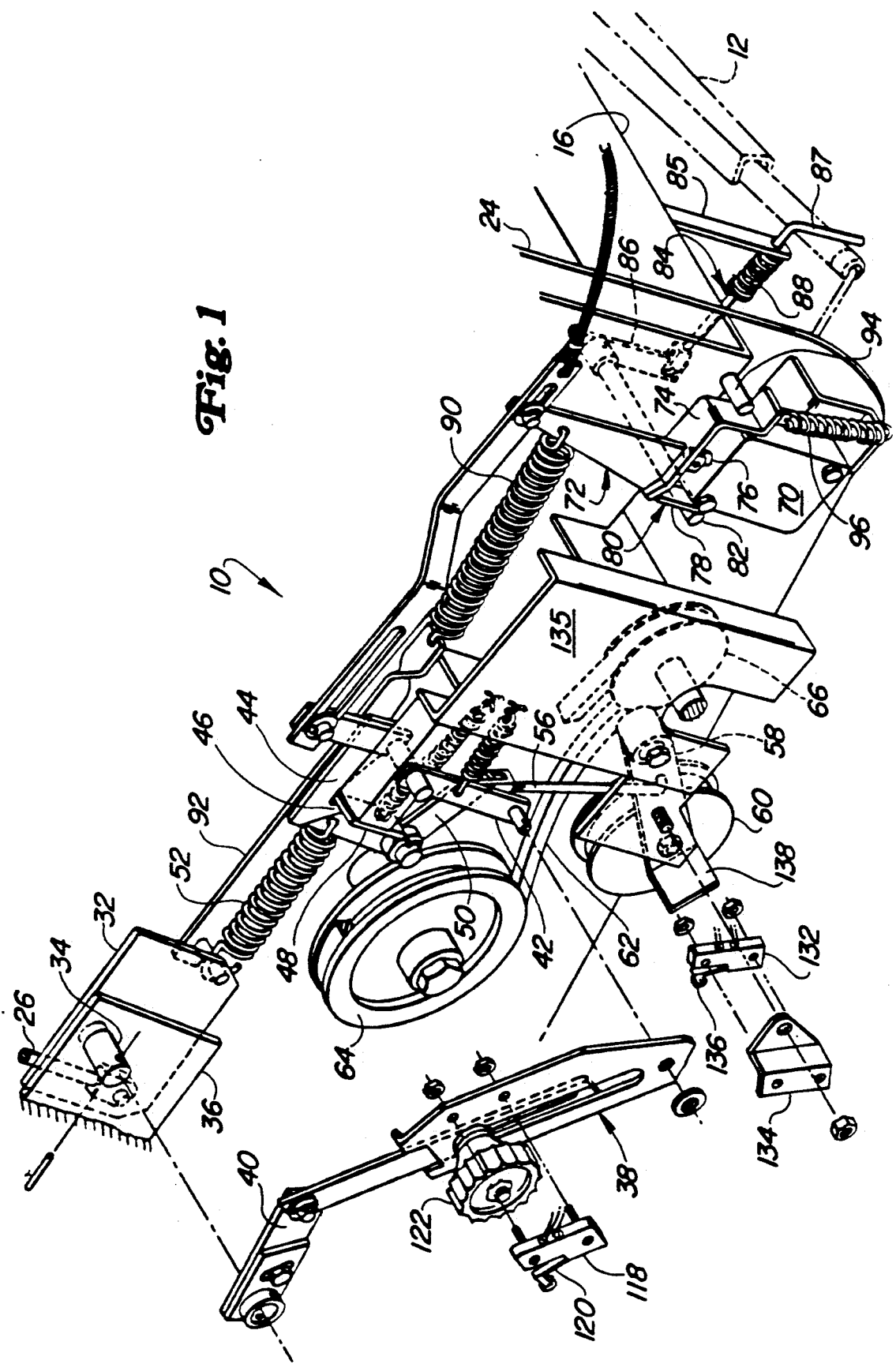

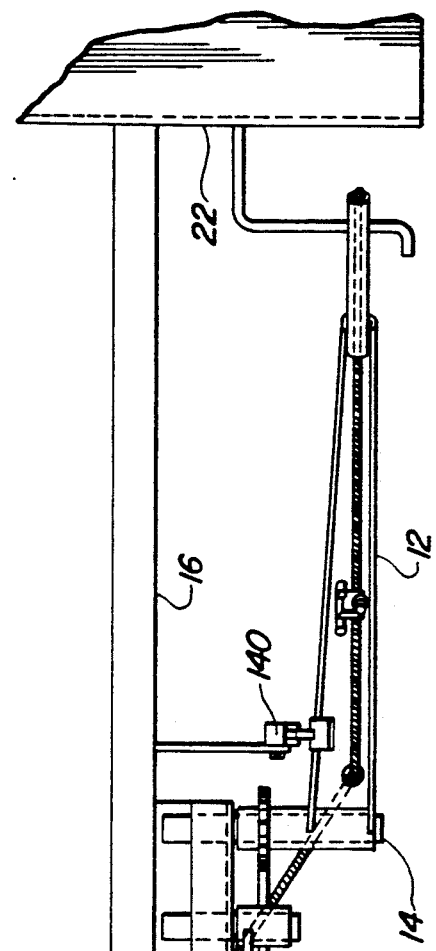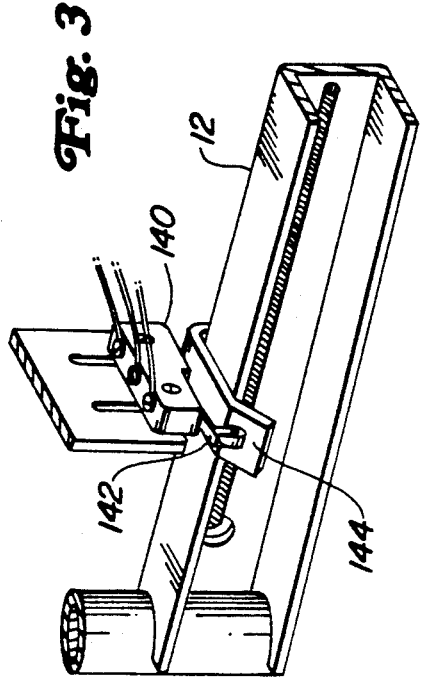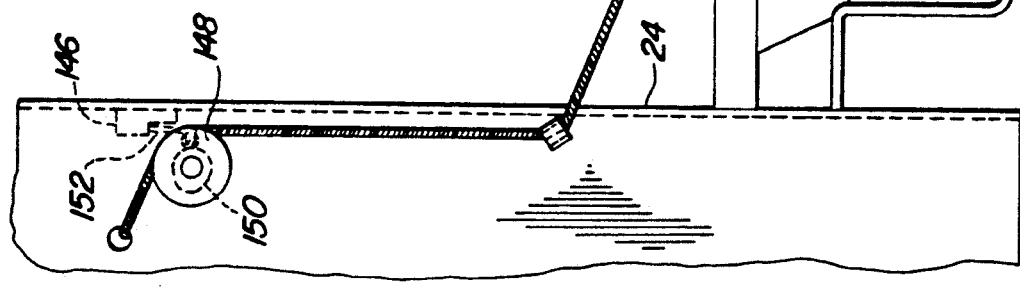

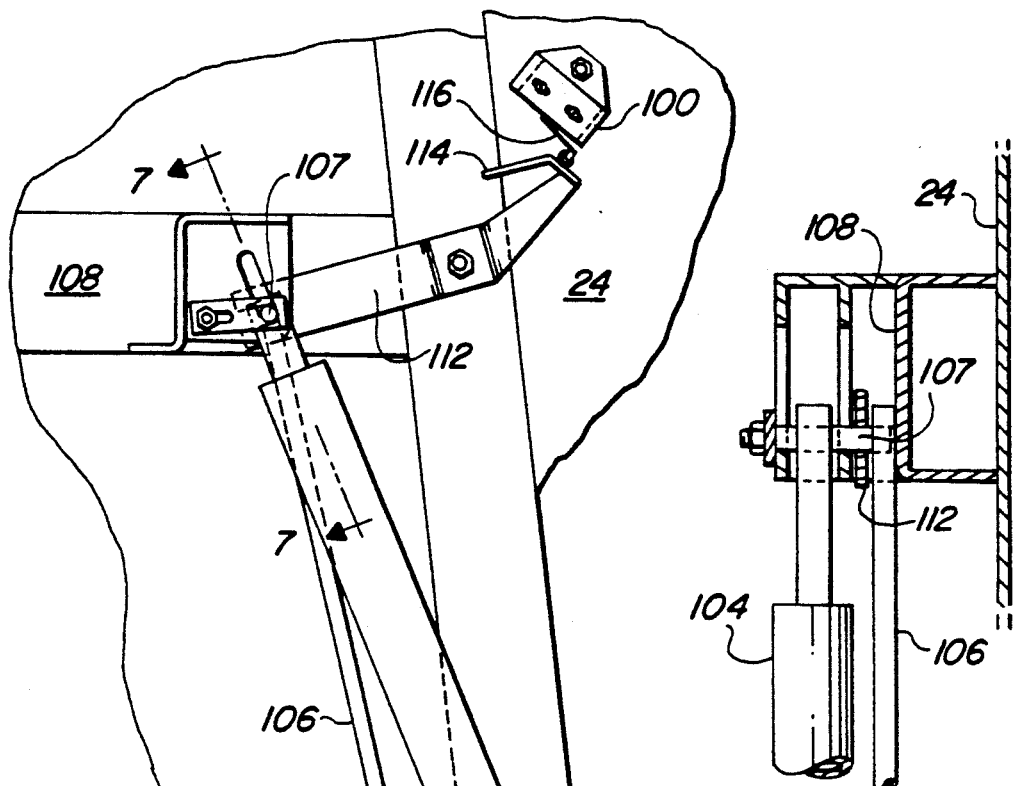
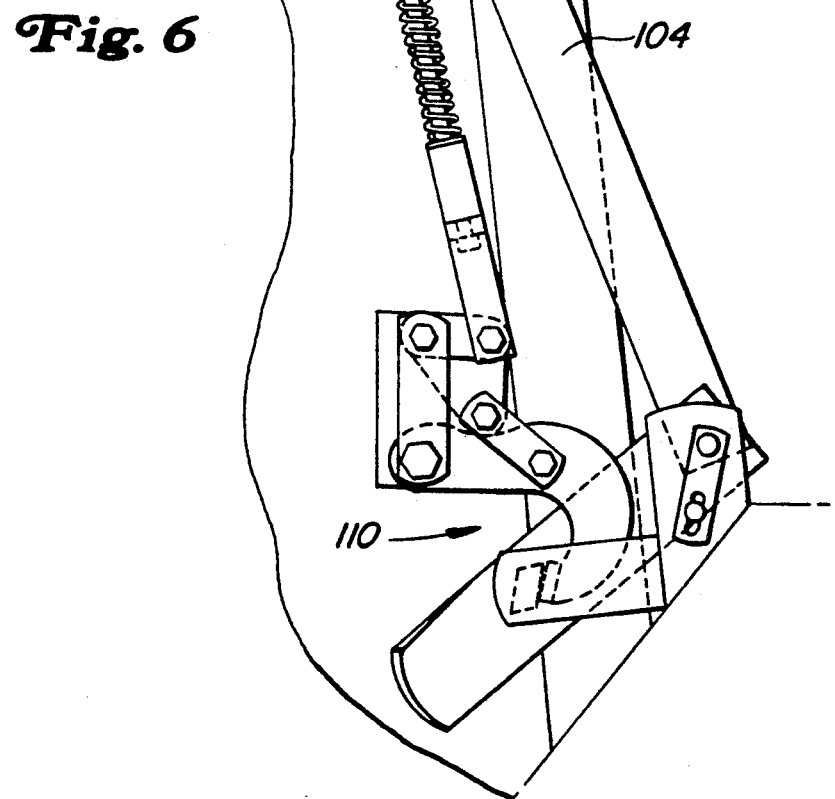
Fig. 6
Fig. 7

INDICATOR SYSTEM FOR ALERTING AN OPERATOR TO THE CONDITION OF A LARGE CYLINDRICAL BALE WRAPPING MECHANISM

This application is a division of application Ser. No. 07/457,445, filed Dec. 27, 1989, and now abandoned.

BACKGROUND OF THE INVENTION

The present invention relates to an indicator system for a large round baler and more specifically relates to such a system as applied to a large round baler for monitoring the condition of various functions used in the wrapping of a baler either with twine or with surface wrap materials such as plastic sheeting or net, for example.

U.S. Pat. No. 4,647,243 granted to Richard W. Koning on Mar., 1987 discloses a mechanism for automatically wrapping a bale with twine, with initiation of the wrapping process being in response to a bale, formed in a bale chamber of the baler, reaching a predetermined size. An indicator system used in conjunction with this baler provided the following signals at the operator station of a towing tractor:

1. A green light, in response to closure of a pair of gate latch switches, to indicate proper closure of the gate.
2. A flashing yellow light, in response to closure of a bale size monitoring switch, to indicate that a bale being formed in the chamber was approaching a predetermined desired size, this signal alerting an operator that the tractor should soon be stopped so as to prevent further crop material from entering the bale chamber.
3. A solid yellow light replacing the flashing yellow light, in response to closure of a twine arm switch, to indicate the beginning of the wrapping process.
4. A red light and buzzer, in response to closure of an oversize bale monitoring switch, to signal an operator that the size of the bale exceeds or is close to exceeding the maximum size for which the baler is designed to make and that the tractor should be stopped in order to avoid damage to the baler.

U.S. Pat. No. 4,667,807 granted to Verhulst et al on Jul. 7, 1987 discloses a surface wrap applying mechanism which is incorporated on a baler having the twine wrap mechanism disclosed in the aforementioned Koning patent such that the same structure for automatically initiating the process for wrapping twine upon a completed bale is used for initiating the process for wrapping a surface wrap upon a completed bale.

The indicator system used in conjunction with the wrapping mechanism disclosed in the aforementioned Koning patent is, of course, somewhat lacking as it does not provide an operator with all of the information desired when wrapping a bale with a surface wrap material. For example, there is no indication of the presence (or absence) of a supply of wrap material nor is there any indication that the wrap material has been properly cut off so as to separate that portion of the material wrapped on a bale from that contained on the supply roll.

SUMMARY OF THE INVENTION

According to the present invention, there is provided an improved indicator system for use with a large round baler having twine and/or surface wrap wrapping mechanisms. An object of the invention is to provide an indicator system as discussed above including circuitry arranged for giving a wide variety of signals to an operator while using a minimum of visual and audible signaling devices.

Yet another object of the invention is to provide an indicator system having an electrical circuit incorporating a simple circuit loop for indicating the presence (or absence) of twine or surface wrap material by having a switch located so as to be actuated by a cam rotated by movement of the twine or surface wrap material.

A more specific object is to provide a circuit loop as described in the immediately preceding object wherein a buzzer is used as the signaling device and the circuit includes a capacitor connected in the circuit for effecting intermittent operation of the buzzer whenever wrap material is being wrapped on a bale.

Still another specific object is to provide a circuit incorporating a buzzer such that the latter emits short buzzes at certain times to signal normal operation is occurring and to emit steady buzzes for indicating other than normal operation which requires quick remedial action be taken by an operator.

Yet another object is to provide an indicator system including a surface wrap material cut-off switch mounted so as to be actuated by the surface wrap material as the latter is deflected by the cut-off blade during cutting of the wrap material to separate the portion wrapped around a bale from the supply roll.

Another object of the invention is to provide a resilient cut-off flap, which serves as an anvil against which the cut-off blade engages tensioned surface wrap material during the cutting of the latter, and a positive blade stop for governing the force with which the blade presses the material against the flap so as to ensure that a switch operating flap that has been pivoted, by tensioned material deflected against the flap, will be returned to its initial position by the action of a return spring once the material has been cut.

These and other objects will become more apparent through a reading of the ensuing description together with the appended drawings.

BRIEF DESCRIPTION OF THE DRAWINGS

FIG. 1 is a right front, partially exploded, perspective view of a portion of a wrapping control mechanism including bale size and pump idler switches respectively mounted to a lost-motion link, which is movable in response to an increase in the size of a bale being formed in the bale chamber of the baler, and mounted adjacent to a pump idler arm actuated in response to movement of the lost-motion link to effect a driving connection with the hydraulic pump which supplies fluid for actuating twine arm and surface wrap cut-off blade arm cylinders.

FIG. 2 is a front elevational view of the twine arm and cylinder for swinging the same, the arm being shown in its home position in engagement with a twine arm switch; and also shown is a twine presence indicator pulley carrying a cam operatively associated with a twine feed indicator switch.

FIG. 3 is a perspective view of that portion of FIG. 2 showing the mounting of the twine arm switch and the cam plate for actuating the twine arm switch.

FIG. 6 is an elevational view of the right side gate latch mechanism and showing the right gate latch switch and the linkage for actuating the same.

FIG. 7 is a sectional view taken along line 7—7 of FIG. 6.

Referring now to FIGS. 1-4, there is shown a bale wrapping control mechanism 10 like that disclosed in the aforementioned U.S. Pat. No. 4,437,399 granted to Koning on Mar. 20, 1984. Specifically, the mechanism 10 includes (FIGS. 2 and 3) a twine arm 12 which is mounted for oscillation about an upright shaft 14 supported by a cross member 16 of the baler frame in a location chosen so the arm will dispense twine across an entrance to a bale chamber so that twine is fed into the chamber with the crop and pulled from the arm as a result of being fed between a bale being formed and belts forming the bale. A hydraulically operated twine arm cylinder 18 is coupled through gearing 20 to the twine arm 12 for swinging the arm between a home position, wherein an outer dispensing end of the arm is adjacent a left sidewall 22 of the bale chamber, to an extreme position wherein the dispensing end is disposed adjacent a right sidewall 24 of the chamber. Operation of the twine arm cylinder 18 and, hence, commencement of the bale wrapping operation is initiated automatically in response to a bale reaching a desired diameter within the bale chamber. Sensing of bale growth in the chamber is done through the action of a bale size link 26 (FIGS. 1 and 4) having its upper end coupled to a short arm 28 coupled for movement in unison with a tensioning arm 30 (FIG. 4) forming part of a bale forming belt tensioning mechanism of the baler. As best shown in FIG. 1, the lower end of the link 26 is connected to a bale size bell crank 32 including a stub shaft 34 pivotally mounted in a fixed support 36 such that the bell crank 32 is pivoted clockwise in response to upward movement of the link 26 as caused by bale growth in the bale chamber. An adjustable lost-motion link 38 is coupled between an arm 40 carried by an outer end of the stub shaft 34 and a lower limb of a latch bell crank 42 pivotally connected to the support 36 and having an upper limb supporting a generally horizontal latch element 44 having a hook 46 formed at its rear end an and being shown in latching engagement with an out-turned latch plate 48 forming part of an upper limb of an idler bell crank 50 also pivotally connected to the support 36. An idler spring 52 is connected between the upper limb of the idler bell crank 50 and the bale size crank 32 such that when the crank 32 is swung clockwise by the action of the link 26, in response to a bale increasing in size in the bale chamber, the spring is tensioned. This movement of the crank 32 eventually causes the link 38 to come to the end of its lost motion whereupon the link acts to release the latch hook 46 from the idler bell crank 50, the spring 52 then acting through the idler bell crank and a link 56 coupled between a lower limb of the crank 50 and an idler pulley arm 58 to swing the arm and an associated idler pulley 60 upwardly to bring the idler pulley into tensioning for engagement with a drive belt 62 trained about a drive pulley 64 and a driven pulley 66. The drive pulley 64 is coupled to the outer end of a cross shaft (not shown) coupled for being driven from the power take-off of a towing tractor while the driven pulley 66 is coupled to a shaft forming part of a hydraulic pump 68, removed from FIG. 1 for clarity but shown schematically in FIG. 12. The pump 68 is hydraulically coupled, in a manner detailed below, for directing fluid to and from the twine arm cylinder 18 by way of a two-position flow reversing valve 70. A valve control lever 72 has a base 74 formed from a plate that is pivotally attached to the upper end of a spool 76 of the valve. The lever 72 is shown in solid lines (FIG. I) in a forward position which it occupies at the beginning of the formation of a bale. The spool 76 is then in a retracted position for effecting retraction of the cylinder 18 which is already retracted at this time. A stop plate 78 of a latch mechanism 80 is then disposed vertically beneath and in engagement with a rearward end portion of the valve base plate 74. The plate 78 is fixed to the outer end of a pivot shaft 82 extending through and rotatably mounted in the right sidewall 24. A forwardly projecting control rod 84 is reciprocally received through a tab 85 depending from the frame cross member 16 and has its rear end coupled to the lower end of an arm 86 fixed to the inner end of the shaft 82 and has a down-turned forward end 87 located in the path of movement of the twine arm 12 so as to be engaged by the latter when the arm approaches an extreme position adjacent the sidewall 24. A return spring 88 is located between a washer carried on the rod 84 and the tab 85. A lever control spring 90 is connected between an upper location of the valve control lever 72 and the forward end of a link 92 having its rearward end coupled to the bale size bell crank 32 and becomes tensioned in response to clockwise movement of the crank during bale growth. Initial tensioning of the spring 90 results in the valve control lever 72 being rocked rearwardly to an intermediate position, this movement of the lever acting to shift the valve spool 76 upwardly to a position for directing fluid to and from the twine arm cylinder 18 for effecting extension of the latter. The lever 72 stops at its intermediate position as a result of a stepped forward end of the base 74 coming into engagement with a stop pin 94. Once the bale growth has reached that point where the lost-motion link 38 acts to effect tripping of the latch 44 and thus engagement of the pump drive, fluid will be supplied for extending the cylinder 18 for driving the twine arm 12 toward its extreme position, shown in FIG. 1. As the arm 12 approaches its extreme position, the arm will engage the down-turned end 87 of the control rod 84 and shift the rod forwardly so as to rotate the shaft 82 and move the stop plate 78 from beneath the lever base 74. The spring 90 will then rock the control lever 74 to a forward position, this movement of the lever causing the valve spool 76 to be shifted downwardly to its position for routing fluid for effecting retraction of the twine arm cylinder 18 whereby the latter acts to return the twine arm to its home position to finish wrapping the bale with twine. The bale discharge gate is then opened to discharge the bale and then returned to its closed position whereupon the belt tension arm 30 returns to its lowered position along with the bale size link 26 and the bale size bell crank 32 is pivoted back to its position shown in FIG. 1. The spring 90 then goes slack and a control lever return spring 96 coupled to the downwardly stepped forward end of the lever base 74 rocks the lever back to its forward position without changing the position of the valve spool 76. This rocking of the lever 72 permits the control rod return spring 88 to act to return the stop plate 78 to its vertical position beneath the rearward end of the lever base 74.

Various microswitches incorporated in an indicator circuit 300 (FIG. 13), described below, are strategically associated with the wrap control mechanism 10 and other structure of the baler associated with the wrapping process for monitoring various functions of the twine wrap mechanism by effecting the energization of indicator devices for apprising an operator of the condition of the wrap mechanism.

Figure 4:
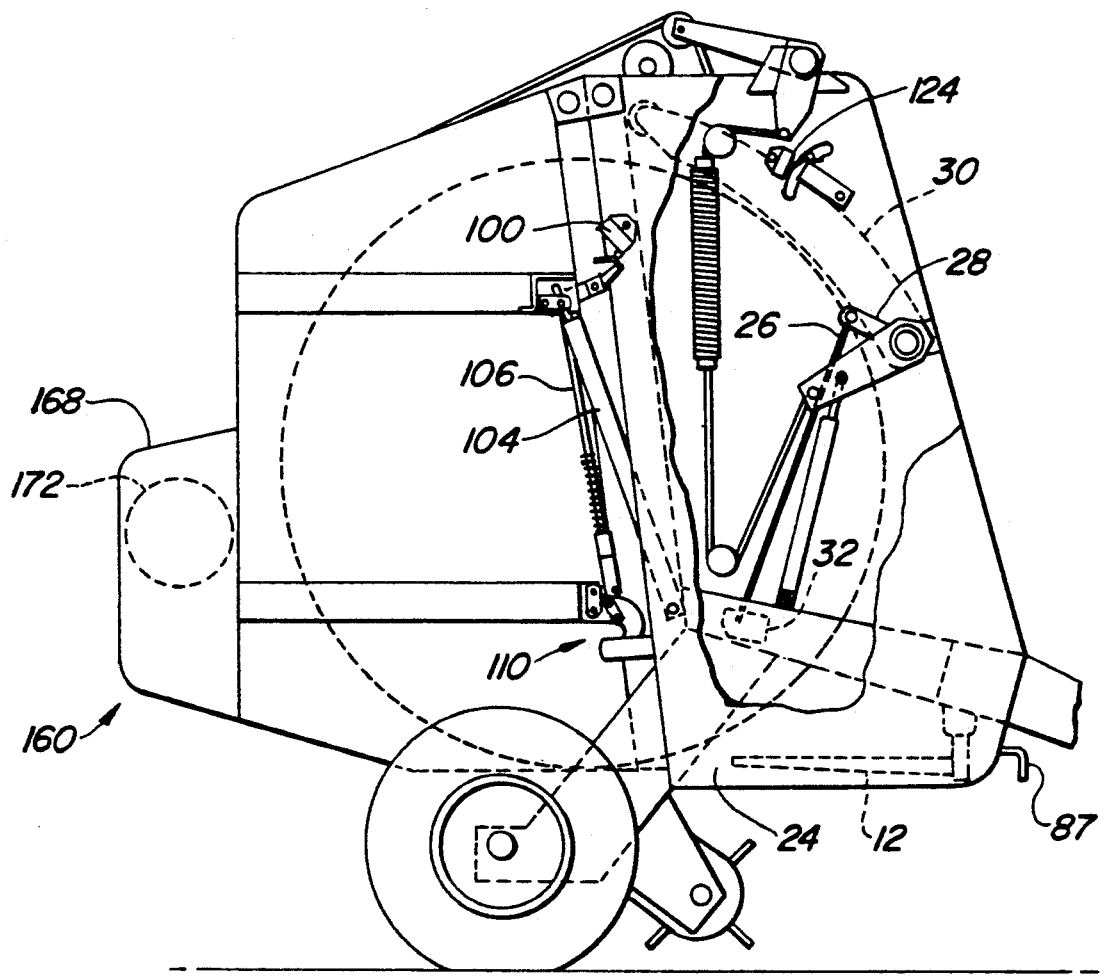
FIG. 4 is a right side elevational view of a baler showing a portion of the bale-forming belt tensioning mechanism together with the oversize bale switch and the linkage for actuating the same in response to an oversize bale being formed in the chamber; and also showing the right gate latch switch and the linkage for actuating it.
Figure 8:
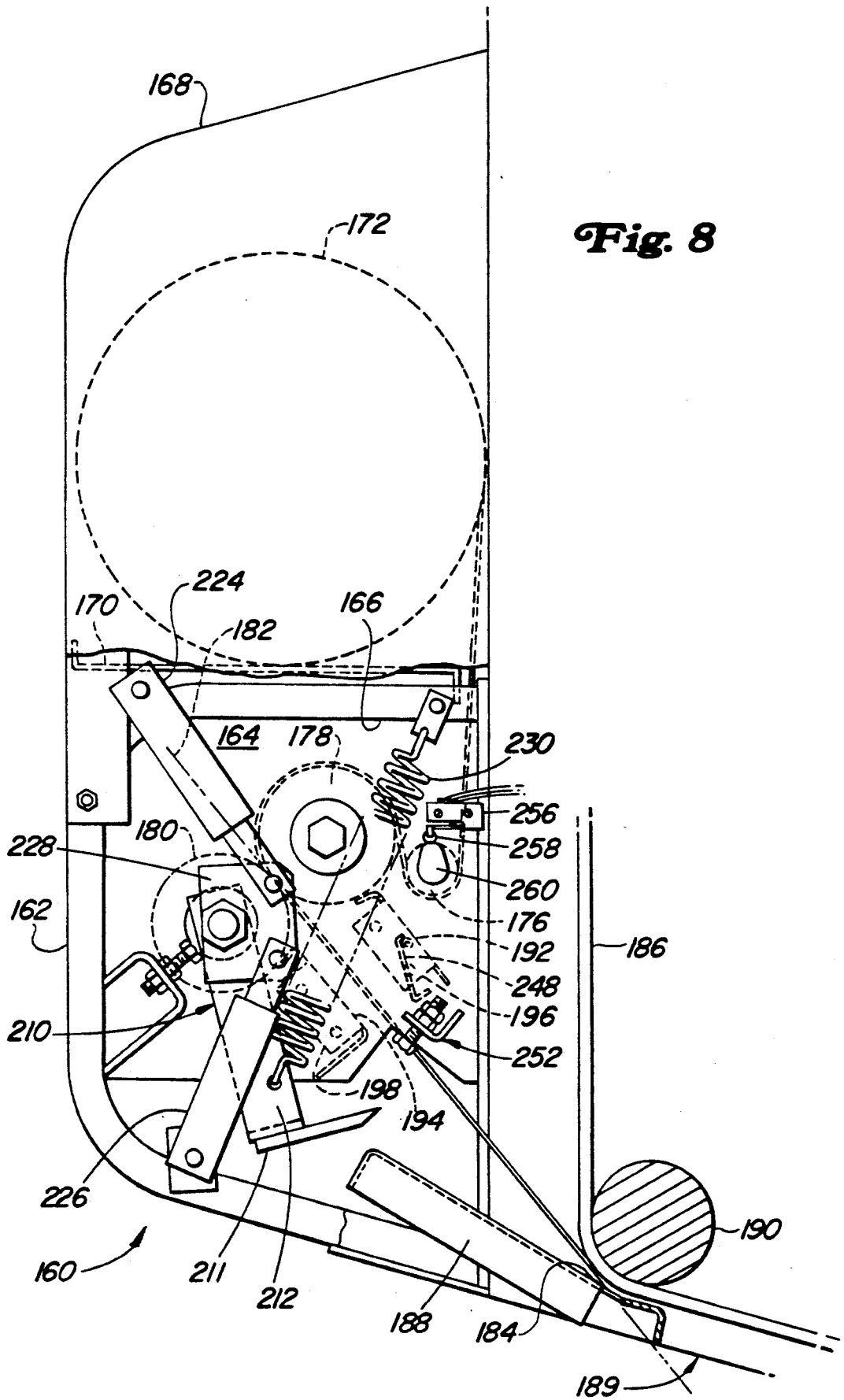
FIG. 8 is a right side elevational view of the surface wrap mechanism, with certain parts located on the exterior of the sidewall wall of the support frame being removed for clarity, showing the cut-off blade in its cocked position and showing the wrap feed switch together with the cam for actuating the switch.
Figure 10:
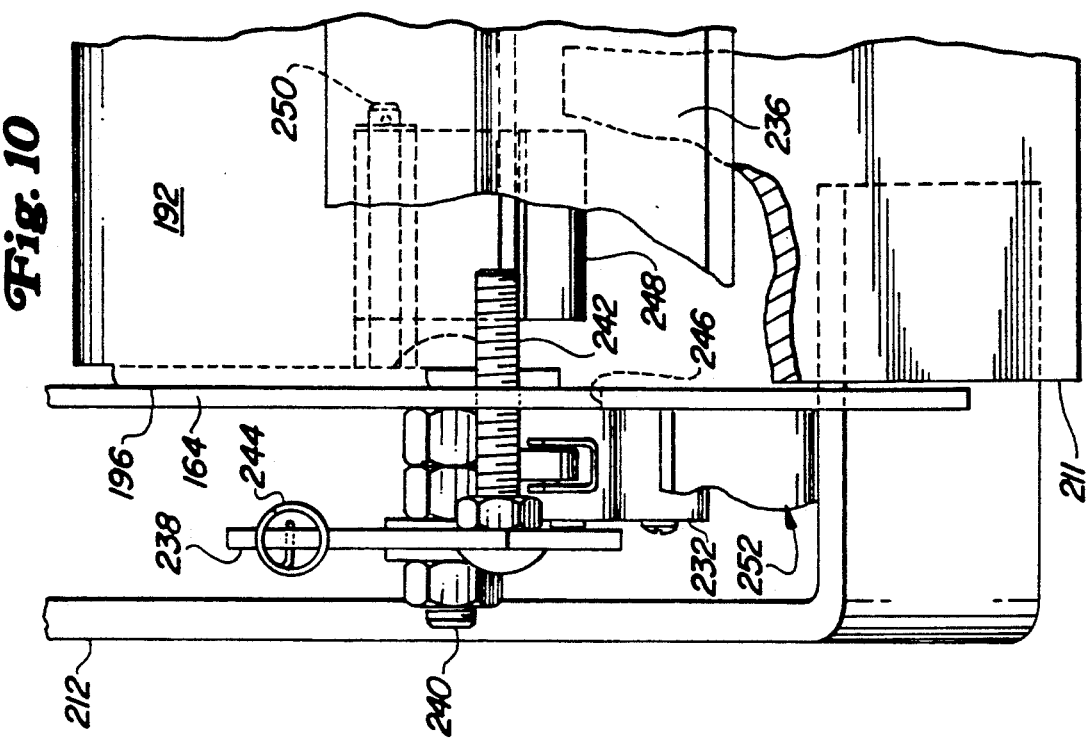
FIG. 10 is a front view of the structure of FIG. 9, with parts being broken away for clarity.

An operator is made aware that a bale discharge gate is properly closed so as to ready the bale chamber for receiving crop to be rolled into a bale by means of a signal initiated by the closing of right and left gate latch switches 100 and 102, of which only the mounting of the right switch 100 is shown (FIGS. 4 and 6). The switch 100 is mounted to the sidewall 24 at a location forwardly of the upper end of a right gate cylinder 104. A gate latch operating rod 106 has an upper pinned to the upper end of the rod end of the cylinder 104 by a pin 107 received through a pair of upwardly elongated slots respectively provided in parallel legs of a mounting bracket fixed to a discharge gate sidewall 108. Extension of the cylinder 104 shifts the rod vertically for unlatching a gate latch 110 acting t o hold the gate closed. A switch actuating arm 112 is pivotally mounted to the sidewall 24 adjacent the switch 100 and includes a forked bottom end received on the pin 107. Upward movement of the rod 106 causes the arm 112 to pivot such that a plate carried thereby and forming a switch ramp 114 effects displacement of a switch actuating element 116 of the switch 100 such as to effect an open condition of the switch.

For the purpose of initiating a signal for apprising an operator of the fact that a bale being formed in the bale chamber is approaching a desired size, as predetermined by the setting of the lost-motion link 38, a normally open bale size switch 118 (FIG. 1) is mounted to a forward portion of the link 38 and has an actuator element 120 disposed for engagement by an adjustment knob 122 of the link to effect closing of the switch in response to the link moving to a position corresponding to that which it occupies when a bale has almost reached the desired size. It is to be noted that the adjustment knob 122 is threaded onto a bolt that projects through aligned and overlapping slots respectively formed in the forward and a rearward portion of the link 38, the knob bearing on a sleeve that is slidable within the slot of the forward portion of the link while cooperating with a head of the bolt to clamp opposite sides of the rearward portion of the link to thus hold the bolt in place in a desired location along the elongate opening of the rearward portion of the link.

Figure 5:
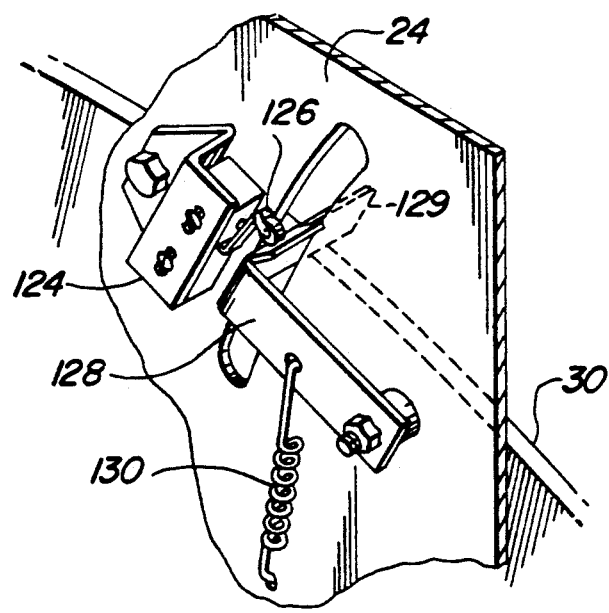
FIG. 5 is a right front perspective view of that portion of FIG. 4 showing the oversize bale switch and its actuator.

Also, for the purpose of initiating a signal for apprising an operator of the fact that an oversize bale is being produced in the bale chamber, an oversize bale switch 124 (FIGS. 4 and 5) is mounted to the exterior of the right sidewall 24 of the bale chamber and includes an actuator element 126 positioned in the path of a switch actuator arm 128 that is vertically pivotally mounted to the sidewall 24. The arm 128 has an in-turned upper end 129 projecting through an arcuate slot and disposed in the path of movement of the tensioning arm 30 such that the latter engages the in-turned upper end of and causes the arm 128 to pivot into engagement with the switch actuator element 126 to effect a change in the condition of the switch when the support arm has pivoted to an upward position which it occupies when an oversized bale has been formed in the bale chamber. A spring 130 connected between the actuator arm 128 and the sidewall 24 normally holds the actuator arm in a normal away from the switch actuator element 126.

An operator is made aware of the engagement of the hydraulic pump drive by a signal effected by actuation of a pump idler switch 132 (FIG. 1) mounted to a bracket 134 adjustably mounted to a support 135 for the pump 68. The switch 132 includes a switch element 136 located in the path of movement of a switch operating ramp 138 defined by a flange formed integrally with the idler arm 58, the ramp being in a first position establishing a first switched condition in the switch 132 when the idler arm is in a lowered drive-disengage position and being disposed relative to the element 136 such that it releases the same and permits it to move to a second position establishing a second switched condition in the switch when the idler arm is raised to its drive-engage position.

An operator is made aware of the beginning of the movement of the twine arm 12 from its home position by a signal effected by actuation of a twine arm switch 140 (FIG. 3) mounted to a bracket depending from the cross member 16 adjacent the upright shaft 14 upon which the twine arm 12 is mounted, the switch having an actuator element 142 having a normal first condition and being located for being engaged and held in a second condition, when the twine arm 12 is in its home position, by an actuator ramp 144 in the form of a plate mounted to the twine arm.

The engagement of the pump drive and the beginning of the movement of the twine arm 12 occur substantially simultaneously with the beginning of the bale wrapping operation and, accordingly, the signals effected by the actuation of the switches 132 and 140 also serve to apprise an operator of the fact that wrapping operation is commencing.

The operator is made aware of whether or not the twine supply carried by the baler is depleted by a signal effected by operation of twine feed switch 146 (FIG. 2) mounted to the baler frame adjacent a visual twine movement indicator in the form of a pulley 148 having a switch-operating cam 150 integral therewith and so disposed relative to a switch element 152 of the switch 146 that the element is contacted and moved from a normal to an actuated position by the cam during each revolution of the pulley, whereby the switch is switched back and forth between normal and actuated conditions during each revolution of the pulley.

Figure 9:
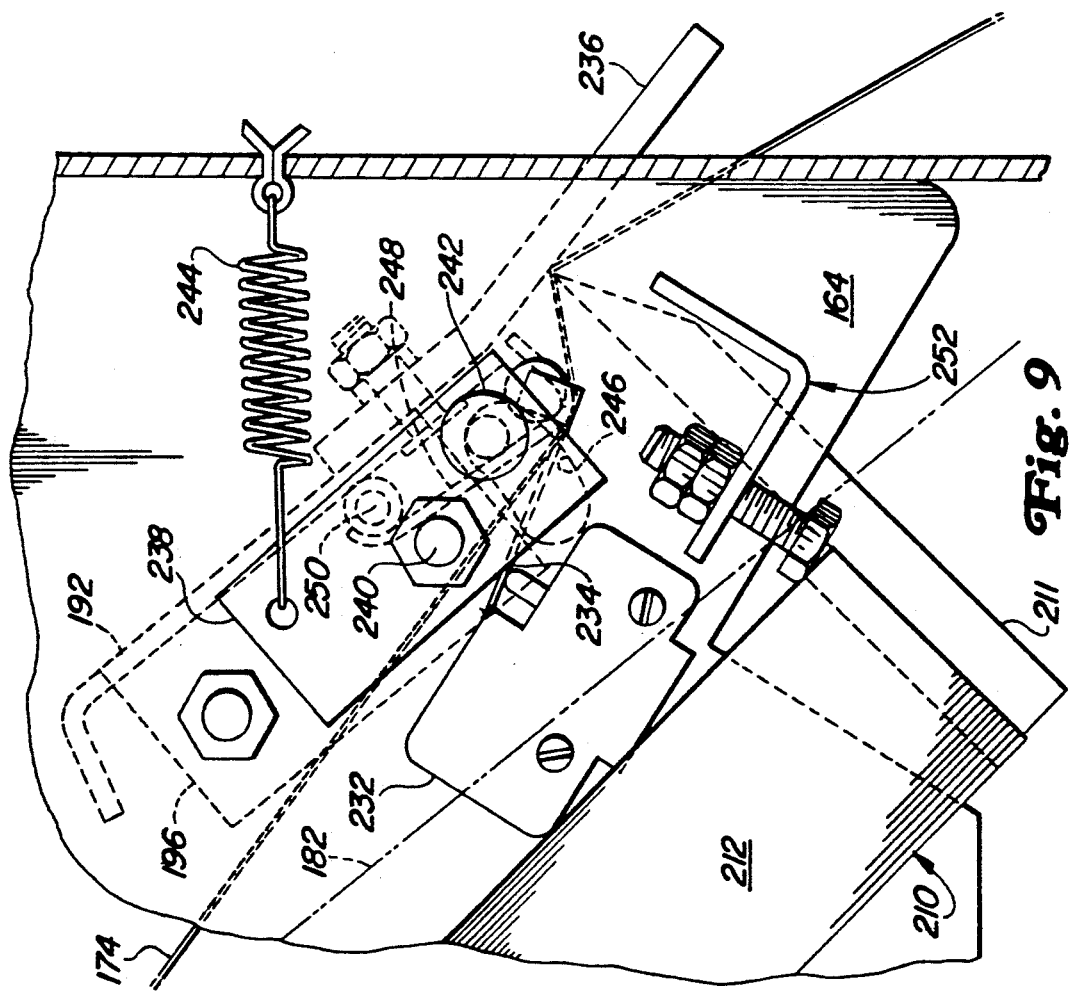
FIG. 9 is an enlarged view of a portion of FIG. 6 but adding those parts removed from FIG. 6 and showing the cut-off blade in its cut-off position against the blade stop and holding the tensioned wrap material just prior to being cut, in a deflected position wherein it holds the switch-operating flap in a pivoted position away from the wrap material feed switch.
Figure 11:
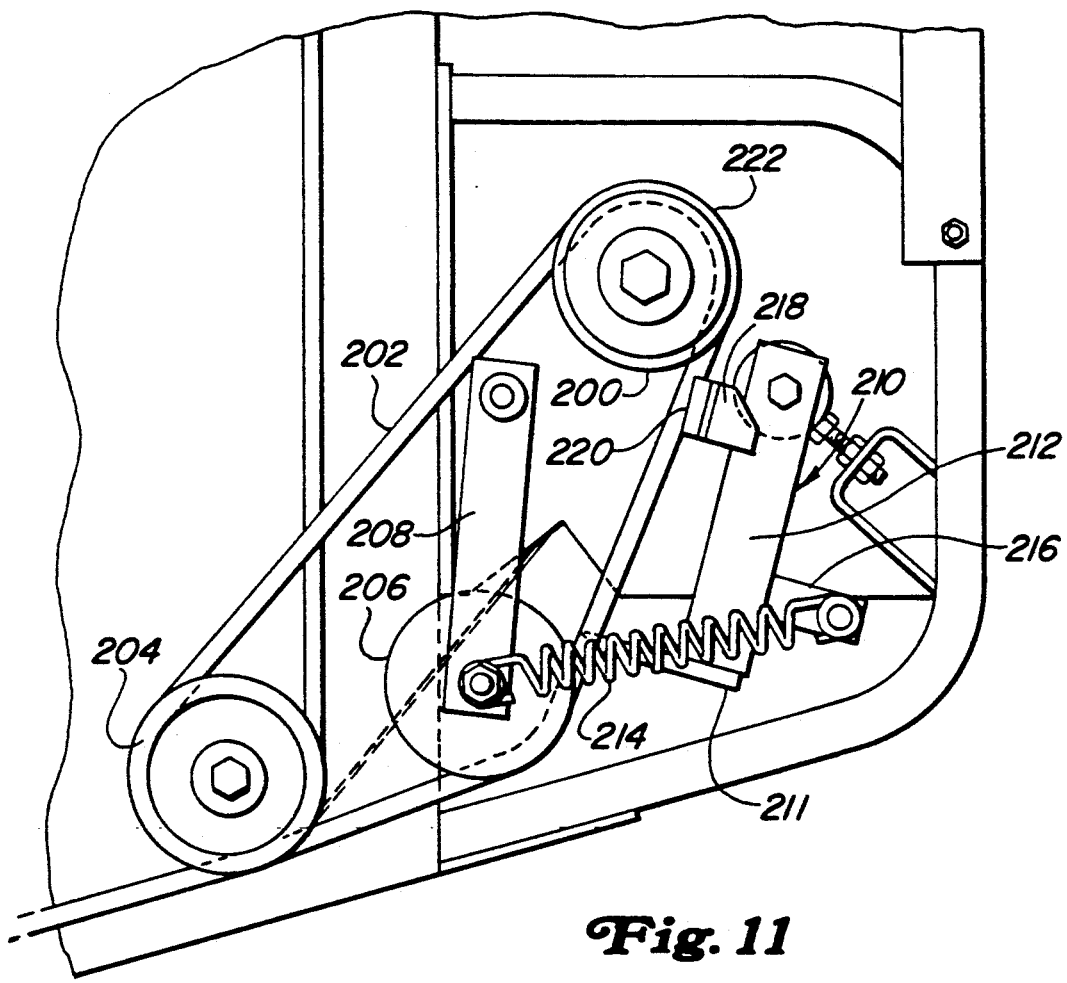
FIG. 11 is a left side elevational view showing the drive for the feed rolls of the surface wrap mechanism with the cut-off blade support arm being shown in its cocked position wherein it effects engagement of the drive while effecting disengagement of a brake associated with the feed rolls.

Referring now to FIGS. 8-11, there is shown a wrapping mechanism 160 for applying a surface wrap such as plastic sheeting or net or the like to a bale formed in the bale chamber. Specifically, the mechanism 160 includes a frame 162 including opposite vertical sidewalls 164 provided with forward vertical flanges bolted or otherwise secured to corresponding flanges forming vertical rear ends of the sidewalls of the baler discharge gate. The perimeter of the each of the sidewalls 164 defined by a reinforcing member having a horizontal upper section 166. A wrap material supply roll box or housing 168 extends between and rests on the sections 166, the housing including a floor 170 which supports a supply roll 172 of surface wrap material such as plastic sheet or net, for example. A length of wrap material 174 is shown extending downwardly from a forward surface of the supply roll and then rearwardly under and in tight engagement with a spreader roll 176 which extends between and is rotatably mounted to the sidewalls 164. From there, the length of material passes rearwardly over and in tight engagement with a forward feed roll 178 and then downwardly and forwardly between the forward feed roll 178 and a rearward feed roll 180 which is in frictional engagement with the forward feed roll so as to be driven thereby. The wrap material extends along a flight path 182 extending tangentially to the feed rolls 178 and 180, the flight path terminating at a pinch point 184 formed between a plurality of side-by-side mounted bale-forming belts 186 and a pan 188 of a wrap material guide member 189 mounted to the bottom of the discharge gate so as to be in contact with the belts in a zone extending from a lower rear belt support roll 190 to a lower front belt support roll (not shown) carried by the discharge gate. Upper and lower material guides 192 and 194, respectively, are formed by plates that extend between the sidewalls 164 respectively above and below and generally parallel to the flight path 182. The guides 192 and 194 have respective pairs of flanges 196 and 198 at their opposite ends and are mounted to the sidewalls 164 by fasteners extending through the flanges. The feed rolls 178 and 180 each extend between and are rotatably mounted in the sidewalls 164, with the left end of the forward feed roll being joined to a pulley 200 (FIG. 11) that is coupled, as by a drive belt 202, to be driven from a drive pulley 204 mounted to a left end of the bale-forming belt support roll 190. The drive to the feed rolls 178 and 180 is effected any time the bale-forming belts are being driven and an idler pulley 206 carried by an idler arm 208 is moved down into tensioning engagement with the lower run of the drive belt 202. Operation of the idler arm 208 between a raised drive-disengage position and a lowered drive-engage position is automatically accomplished in response to the movement of a wrap material cut-off blade assembly 210 including a cut-off blade 211 that extends between and is mounted to in-turned bottom ends of right and left blade support arms 212 having their upper ends pivotally mounted on respective outward extensions of the opposite ends of a rod forming a fixed core of the rearward feed roll 180, the left support arm being connected to the idler arm 208 by an idler control spring 214 having one end connected to an out-turned end of a bracket 216 fixed to the left blade support arm and having its other end connected to the idler arm. Also connected to the left blade support arm at a location above the bracket 216 is a brake pad support 218 having a brake pad 220 mounted thereto and located for engagement with a brake drum 222 mounted to the left end of the forward feed roll 178 for rotation therewith, the brake pad becoming engaged with the drum so as to firmly hold the wrap material and maintain tension therein when the cut-off blade support arms 212 are swung forwardly so as to bring the blade 211 into contact with the wrap material to effect severing of the latter. Movement of the blade assembly 210 is effected by upper and lower, single-acting, cut-off blade arm cylinders 224 and 226, respectively. Specifically, a substantially square cylinder mounting plate 228 is located outboard of the right blade support arm 212 and is mounted for rotation with the arm about the axis of the rear feed roll support shaft. The upper cylinder 224 has its rod end connected to an upper forward location of the plate 228 and has its head end coupled to an upper rear location of the sidewall 164. The lower cylinder 226 has its rod end coupled to a lower forward end of the plate 228 and has its head end coupled to a lower rear location of the side wall 164. The upper and lower cylinders are respectively extended and retracted when the blade assembly 210 is in its rearward cocked position (FIG. 8) and are respectively retracted and extended when the blade assembly is in its forward cut-off position (FIG. 9). A blade assembly retention spring 230 (FIG. 8) is connected between the right blade arm 212 and the sidewall 164 and acts to ensure that the blade assembly 210 does not gravitate from its cut-off position to effect unwanted engagement of the surface wrap drive, as might happen due to operating fluid leakage for example.

Further microswitches are provided for apprising an operator of certain aspects of the surface wrapping mechanism 160 during the wrapping process. Specifically, a wrap material cut-off switch 232 (FIG. 9) having an actuator element 234 is mounted to the exterior of the right sidewall 164 at a location on the opposite side of the sidewall from the flange 196 of the upper guide 192. A flexible, cut-off flap 236, made from rubber belting or the like, is mounted to and forms a forward extension of the guide 192, the flap having a free forward end portion located in the path of movement of the blade 211 so as to act as an abutment against which the wrap material is engaged by a cutting edge of the blade 211 whereby the flap aids in the cutting off of the wrap material. A pivot plate 238 is mounted for pivoting about a bolt 240 that is mounted to and projects outwardly from the sidewall 164 at a location spaced above the switch element 234, the plate 238 having an inwardly projecting switch actuator pin 242 mounted at its lower end and having a return spring 244 coupled between its upper end and an out-turned flange of the sidewall 164 so as to bias the plate 238 clockwise about the pivot bolt 240 to thereby urge the pin 242 against the switch element 234 so as to releasably maintain the latter in a first switched condition. The pin 242 extends through an arcuate opening 246 provided in the sidewall 164 and has an inner end portion located for contact by a sheet metal switch-actuator flap 248 that is formed so as to be generally L-shaped in cross section, the flap extending transversely inwardly from and having its upper end pivotally mounted, as at a pin 250, to the inside of the right flange 196 of the upper guide 192 for movement about an axis located just above and forwardly of the axis of the pivot bolt 240. The switch-actuator flap 248 is located between the flight path 182 of the wrap material and the cut-off flap 236 such that a lower portion thereof is disposed just behind the actuator pin 242 when the cut-off blade assembly is in its cocked position. Upon the cut-off blade assembly 210 being moved forwardly toward its cut-off position, the blade 211 will contact the wrap material and deflect it into engagement with the flap 248 causing the latter to pivot counterclockwise, as viewed in the drawing, the flap engaging the actuator pin 242 and causing the pivot plate 238 to be rotated counterclockwise against the force of the return spring 244. This movement of the pin 242 permits the switch element 234 to move to its normal position. Once the surface wrap material is cut, the tension is released therefrom whereupon the return spring 244 acts to pivot the plate 266 and actuator pin 242 clockwise, the latter engaging the switch element 234 to return the switch 232 to its first switched condition. Thus, the switch-actuator flap 248 and the actuator pin 242 form a portion of movably mounted switch actuator means for effecting actuation of the switch between its first condition, corresponding to when the blade assembly 210 is in its cocked position, and its normal second condition, corresponding to when the blade assembly is in its cut-off position. To ensure that the tension of the surface wrap material is released once the material is cut, a positive blade stop 252, formed by an adjustable bolt mounted to a bracket 254 fixed to the right sidewall 164, is located to be engaged by the blade arm 212 stop just at the time the cutting edge has pressed the wrap material against the cut-off flap 236 with sufficient force to aid in cutting but not with so much force that the material remains pinned against the flap and prevents the return spring 244 from returning the plate 238 and hence the switch element 234 back to their initial positions. Thus, by using the switch 232 to operate an appropriate indicator as is described below, an operator is able to discern whether of not the supply of wrap material is depleted and whether or not the wrap material has been cut.

An alternate or additional switch may be used for the purpose of determining if the supply of wrap material has or has not become depleted. Specifically, mounted to the right sidewall 164 is a wrap material feed switch 256 (FIG. 8) having a switch element 258 located in the path of rotation of a switch-operating cam 260 mounted to a rightward extension of the spreader roll 176 and being shaped for engaging and releasing the switch element 258 once during every rotation of the spreader roll. Thus, during the wrapping of a bale with surface wrap material the switch 256 will be caused to be switched back and forth between two different switched conditions so long as material is being pulled off the supply roll 172. In the absence of such material, the switch will remain in one or the other of its switched conditions.

Figure 12:
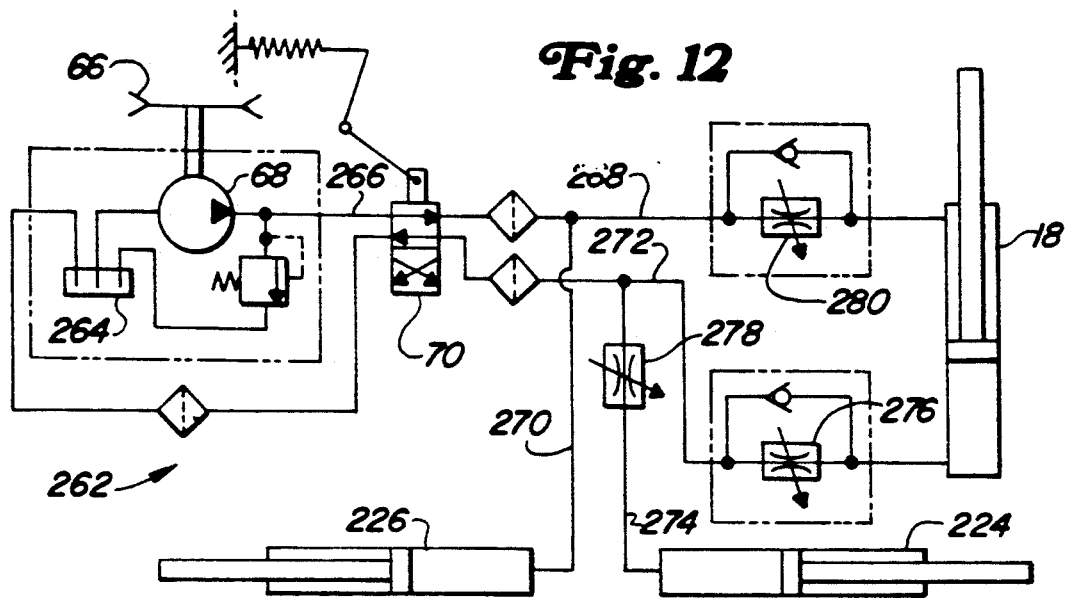
FIG. 12 is a hydraulic circuit diagram showing a common hydraulic system for effecting both the actuation of the twine arm cylinder and the actuation of the wrap material cut-off cylinders.

Referring now to FIG. 12, there is shown a hydraulic circuit 262 for effecting actuation of both the twine arm cylinder and the pair of cut-off blade assembly cylinders. Specifically, the circuit 262 comprises the pump 68 having an inlet coupled to a reservoir 264 and having an outlet coupled, as by a feed conduit 266, to a pressure port of the flow reversing valve 70, the latter having a sump port connected to the reservoir 264. A first supply/return conduit 268 is connected between the valve 70 and the rod end of the twine arm cylinder 18. A branch conduit 270 is connected between the conduit 268 and the head end of the lower blade arm cylinder 226. A second supply/return conduit 272 is connected between the valve 70 and the head end of the twine arm cylinder 18. A branch conduit 274 is connected between the conduit 272 and the head end of the upper blade arm cylinder 224. A first variable restrictor valve 276 is located in the conduit 272 for controlling the rate of retraction of the twine arm cylinder and in that way controls the number of wraps of twine being placed upon a bale when twine is the wrapping medium When such is the case, a shut-off valve 278 located in the branch conduit 274 is closed so that the upper blade arm cylinder 224 remains in its extended condition wherein the blade arms 212 are held in their cut-off position so as to keep the feed roll drive in its disengaged condition A second variable restrictor valve 280 is located in the conduit 268 for controlling the rate of extension of the twine arm cylinder 18 for the purpose of controlling the time at which the reversing valve 70 will be reversed to route pressure fluid to the lower blade arm cylinder 226 to effect upward swinging movement of the blade arms to their cut-off position. In this way the restrictor valve 280 determines the amount of wrap material placed on a bale.

Figure 13:
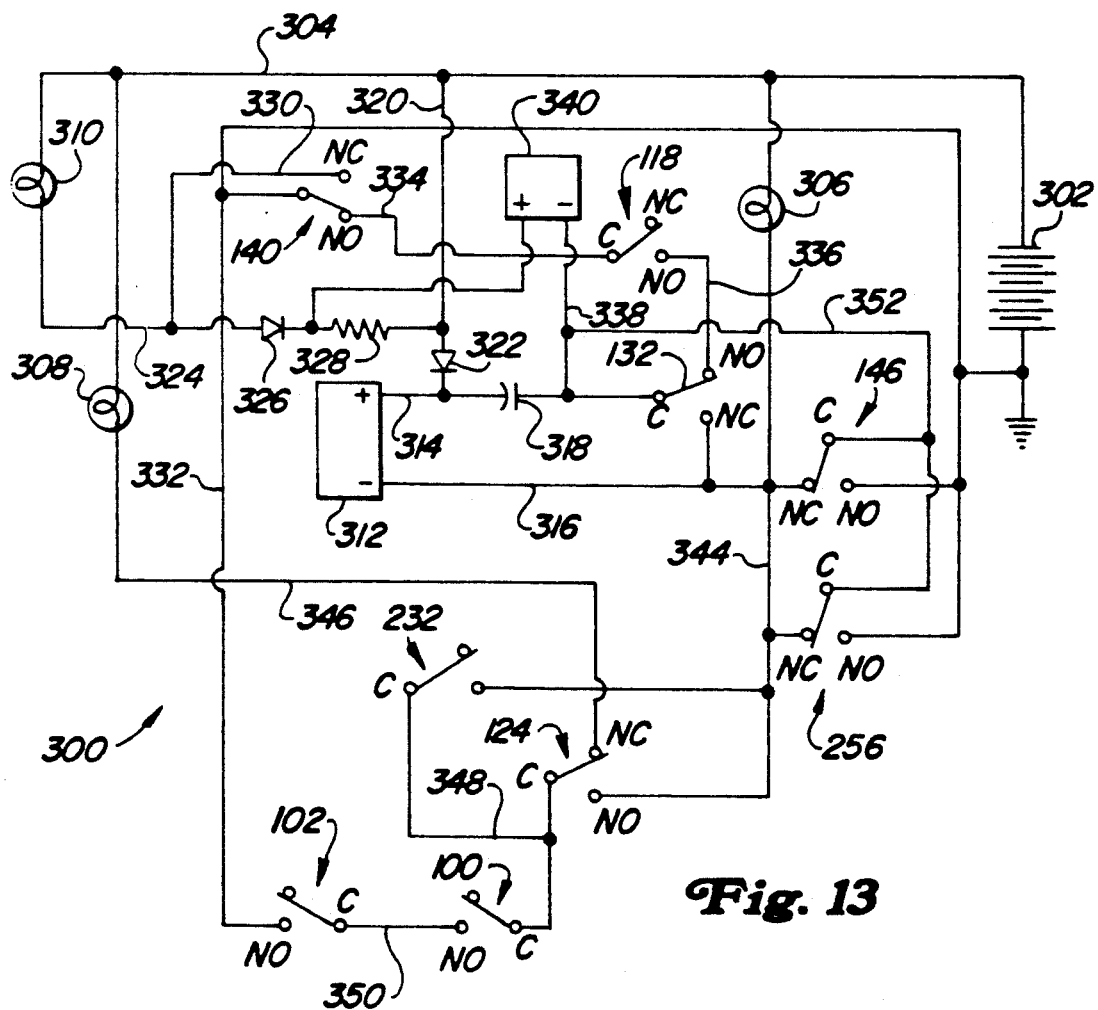
FIG. 13 is a diagram of an indicator circuit of an indicator system constructed in accordance with the principles of the present invention. cl DESCRIPTION OF THE PREFERRED EMBODIMENT The description hereinafter may refer to certain components as occurring in pairs when only one or the other of right and left components is visible. It is to be understood that the missing component is similar in construction to the one shown.

Referring now to FIG. 13, there is shown the indicator circuit 300 which embodies all of the microswitches described above along with indicator devices controlled by the switches. Specifically, the circuit 300 includes a source of electrical power here shown as a battery 302 which may be that of a towing vehicle, such as a tractor, for example. A power lead 304 extends from a positive pole of the battery and connected in parallel thereto is a positive terminal of each of red, green and yellow lights 306, 308 and 310, respectively. A buzzer or horn 312 is connected in a circuit including first and second leads 314 and 316 respectively connected to positive and negative terminals of the buzzer, with the lead 314 being connected to a common or C terminal of the pump idler switch 132, the latter having a normally closed or NC terminal connected to the second lead 316 and to which the buzzer lead 314 is connected when the pump idler arm is in its drive-engage position, and a normally open or NO terminal to which the lead 314 is connected when the pump idler arm is in its drive-disengage position. A capacitor 318 is connected in the buzzer lead 314 between the positive terminal of the buzzer 312 and the C terminal of the pump idler switch 132. A branch 320 of the power lead 304 is connected to the buzzer lead 314 at a location between the buzzer 312 and the capacitor 318 and contains a diode 322 for permitting current flow only in the direction of the lead 314. A lead 324 is interconnected between a negative terminal of the yellow light 310 and a location of the power lead branch 320 between the power lead 304 and the diode 322, the lead 324 containing a diode 326 for permitting current flow only in the direction of the branch 320, and a resistor 328 is located between the diode 326 and the branch 320. The lead 324 includes a branch 330 located between the yellow light 310 and the diode 326 and being connected to a normally closed or NC terminal of the twine arm switch 140. A common or C terminal of the switch 140 is connected to a ground lead 332 which is in turn connected to a negative post of the battery. A normally open or NO terminal of the switch 140 is connected, as by a lead 334, with a common or C terminal of the bale size switch 118. The bale size switch 118 has a normally open or NO terminal connected to the NO terminal of the pump idler switch 132 by a lead 336. Having a first end connected to the buzzer circuit lead 314 at a location between the capacitor 318 and the C terminal of the pump idler switch 132 is a flasher lead 338 having a second end connected to a negative terminal of a flasher 340 having its positive terminal connected by a lead 342 to the lead 324 at a location between the diode 326 and the resistor 328. The wrap material cut-off switch 232 and the oversize bale switch 124 each include a normally open or NO terminals, with the NO terminals being connected in parallel with each other and to the buzzer lead 316 by a branched lead 344 extending from a negative terminal of the red light 306. A lead 346 connects a normally closed or NC terminal of the oversized bale switch 124 to a negative terminal of the green light 308. Also a branched lead 348 connects respective common or C terminals of the switches 124 and 232 in parallel with each other and to a common or C terminal of the right hand gate switch 100, the latter switch having a normally open or NO terminal connected, as by a lead 350, to a common or C terminal of the left hand gate switch 102 which in turn has a normally open or NO terminal connected to the ground lead 332. Thus it will be appreciated that the right and left gate latch switches 100 and 102 are connected in series. The twine and surface wrap feed switches 146 and 256, respectively, have their common or C terminals connected in parallel with each other and to the flasher lead 338 by a branched lead 352, with respective normally open or NO terminals of the switches being connected in parallel to the ground lead 332 and with respective normally closed or NC terminals of the switches being connected in parallel with each other and to the branched lead 344.

The operation of the indicator circuit 300 is as follows: Assuming a baler embodying the bale wrapping control and surface wrapping mechanisms 10 and 160, respectively, to be in a condition for beginning baling operation, the right and left hand gate switches 100 and 102 will be switched to their NO terminals, the wrap material cut-off switch 232 and the oversize bale switch 124 will each be switched to its respective NC terminal, the pump idler switch 132 will be switched to its NO terminal, the bale size switch 118 will be open and the twine arm switch 140 will be switched to its NO terminal. Also, it will be assumed that the cams 150 and 260 for respectively actuating the twine and surface wrap feed switches 146 and 256 are positioned such that the switches are each switched to its NC terminal. And lastly, it will be assumed that the wrap medium being use is twine.

With the switch conditions and other assumptions made above, the green light 308 will be lit to signal an operator that it is alright to commence baling, it being noted that the green light is in a completed circuit path through the oversize bale switch 124 and the series-connected right and left hand gate latch switches 100 and 102, respectively. None of the other signal devices will be energized.

Then, as a bale being formed in the bale chamber approaches the desired size, the adjustable lost-motion link 38 will occupy a position wherein the adjustment knob 122 effects closure of the bale size switch 118 The yellow light 310 will then be connected in a completed circuit path through the diode 326, the flasher 340, the pump idler switch 132, the bale size switch 118 and the twine arm switch 140. The yellow light 310 will then be flashing and in this way will signal an operator that the bale is almost complete and that he should prepare to stop the tractor.

Shortly after the bale size switch 118 closes, the bale will reach full size resulting in the adjustable lost-motion link 38 acting through the latch bell crank 42 to release the hook 46 of the latch element 44 from the idler bell crank 50 thereby permitting the spring to rotate the idler pulley arm 58 and effect actuation of the drive of the pump 68 and closure of the pump idler switch 132 Closure of the switch 132 results in a circuit being completed across the capacitor 318 to effect charging of the same. Actuation of the drive for the pump 68 results in fluid being pumped to the flow reversing valve 70 which by this time has been automatically shifted, as a result of counterclockwise movement of the bale size crank 32, to route fluid to the head end of twine arm cylinder 18 to effect extension of the latter for swinging the twine arm 12 from its home position to its other extreme position, it being noted that the shut-off valve 278 is now closed so as to prevent the upper blade support arm cylinder 224 from being extended to move the arms 212 from their cut-off position. The twine arm 12, upon moving toward its other extreme position, carries the actuator ramp 144 away from the element 142 of the twine arm switch 140 whereby it is switched to its normally closed position wherein it establishes a direct current path between the yellow light 310 and the ground lead 332 so that the flashing of the yellow light goes solid to indicate that wrapping operation is about to commence. Upon the twine arm switch 140 becoming switched to its NC terminal, the circuit across the capacitor 318 is interrupted which causes the capacitor to discharge across the buzzer 312 causing the latter to emit a short buzz. Thus, the switches 132 and 140 serve as wrap beginning switches for effecting respective signals, i.e., the solid yellow light and the short buzz which alert the operator that he should stop the tractor immediately so that no further crop material is fed into the bale chamber, it being especially important that the feeding of material into the bale chamber be stopped when wrapping a bale with surface wrap so as to prevent material from being wrapped between layers of the wrap material.

Movement of the twine arm 12 towards its other extreme position results in a length of twine dangling from the end of the twine arm being caught by crop material entering the bale chamber and being caught between the formed bale and the bale-forming belts 186 and pulled from a supply roll of twine as the bale rotates to thereby spiral wrap the bale with twine. This movement of twine into the bale chamber causes the visually discernible twine indicator pulley 148 to rotate thus causing the switch-operating cam 150 to rotate into and out of engagement with the twine feed switch element 152 to thereby cause the twine feed switch 146 to be switched back and forth between its NO and NC terminals. Every time the switch 146 is switched to its NO terminal, a circuit is completed across the capacitor 318 causing the latter to become charged and every time the switch 146 is switched back to its NC terminal, the charging circuit is broken but the charged capacitor is then coupled across the buzzer 312 and discharges to cause the latter to emit a short buzz. The result is a warble tone, as opposed to a more obnoxious solid tone, which lets the operator know that the supply of twine carried by the baler is not yet depleted. Of course, if the operator does not hear the warble tone once the yellow indicator light 310 has gone solid, he will know that the supply of twine is depleted. It is here noted that it makes no difference where the switch-operating cam 150 stops after the twine is cut since, even if the cam stops with the switch 146 switched to its NC terminal, the buzzer 312 will soon drain the charge from the capacitor 318 and quit buzzing.

In the event that an oversize bale is formed in the bale chamber, the belt tension arm 30 will move into engagement with the switch actuator arm 128 and rotate the same such that the switch operating ramp carried thereby engages the switch element 126 of the oversize bale switch 124 to thereby switch the latter to its NO terminal. A current path is thus established which results in the red light 306 being lit, the buzzer 312 being energized to emit a steady buzz and in the interruption of the current path of the green light 308 causing the latter to go out, with the red light, continuous buzzer and absence of a green light serving to warn an operator that he must stop the tractor immediately to avoid possible serious damage to the baler as might occur if additional crop were fed into the already full baler.

Upon the twine arm 12 approaching its other extreme position, it will contact the downwardly extending forward end of the control rod 84 and pull the latter forwardly to release the latch or stop plate 78 from beneath the valve control lever base 74 thereby permitting the spring 90 to act through the lever 72 to shift the valve spool 76 to reverse the flow of fluid to and from the twine arm cylinder 18. The cylinder 18 will thus be retracted to move the arm back to its home position, the switch actuating ramp 144 then being carried into engagement with the switch element 142 of the twine arm switch 140 to switch the latter back to its NO terminal The yellow light will then go out indicating that the bale has been wrapped and is ready to be discharged. It is here noted that the warble tone indicating the presence of twine will now cease since movement of the twine arm back to its home position will automatically effect the cutting off of the twine in a manner well known in the art.

In the event that the bale is being wrapped with surface wrap material, all wrapping functions will operate as noted above with the exception that the shut-off valve 278 will now be open such that the upper blade arm cylinder 224 will extend to move the blade support arms 212 to their cocked position immediately upon fluid being supplied by the pump 68. This movement of the blade support arms 212 will cause the idler arm 208 to be moved to effect engagement of the idler pulley 206 with the drive belt 202 to tension the latter and effect driving of the wrap material feed rolls 178 and 180. Wrap material then is impelled by the rolls 178 and 180 along the flight path 182 to the pinch point 184 between the bale forming belts 186 and the guide pan 188 whereby the wrap material is carried into the bale chamber and caused to be wrapped on a bale, it being noted that the peripheral speed of the bale being wrapped is faster than that of the feed rolls 178 and 180 so that the length of the wrap material extending between the feed rolls bale chamber is tensioned Upon the wrap material being fed into the bale chamber, the spreader roll 176 will be rotated to thus effect rotation of the switch-operating cam 260 which becomes engaged and disengaged with the switch element 258 of the wrap material feed switch 256 and switch the latter back and forth between its NC and NO terminals. Every time the switch 256 is switched to its NO terminal, a charging circuit is completed across the capacitor 318 and every time the switch 256 is switched to its NC terminal, the electrical charge is discharged across the buzzer 312 This operation results in the buzzer emitting a warble tone which lets an operator know that the supply of surface wrap material carried by the baler is not depleted. Of course, an absence of the warble tone shortly after the yellow light 310 becomes solid and the buzzer emits a short buzz to indicate that the wrapping process has begun would mean that either the supply of surface wrap material is depleted or that the latter is misfed, i.e., not placed around the spreader roll, for example.

Meanwhile the twine arm 12 will have engaged the control rod 84 for the effecting removal of the stop plate 78 from beneath the valve control arm 72 so as to permit the latter to rock to its rearward position and shift the valve spool 76 downwardly to effect reversal of flow to and from the twine arm cylinder 18. This reversal of flow results in pressure fluid being directed to the head end of the lower blade arm cylinder 226 which operates to swing the assembly 210 and, hence, the cut-off blade 211 to its out-off position, it being noted that this movement of the left arm acts through the spring 214 and idler arm 208 to effect disengagement of the feed roll drive and also to bring the brake pad 220 into engagement with the brake drum 222 so as to immediately stop the movement of wrap material through the feed rolls 178 and 180 and to ensure that the wrap material located along the flight path 182 remains sufficiently tensioned to aid in the cutting thereof. When the blade 210 engages the wrap material, the latter will be deflected into engagement with the switch-operating flap 248 which pivots and, through its engagement with the switch actuator pin 242, causes the pivot plate 238 to be pivoted against the force of the return spring 244 and the pin 242 to be moved away from the switch element 234 of the wrap material cut-off switch 232 to permit the latter to be switched to its NO terminal to thereby effect a ground circuit for the red light 306 and the buzzer 312. The red light 306 is thus lit and the buzzer 312 sounds to indicate to the operator that wrapping of a bale and cutting off of the wrap material has been completed. However, this lighting of the red light 306 and actuation of the buzzer 312 is only momentary under normal circumstances, since once the wrap material has been cut, it is no longer tensioned and the spring 244 returns the plate 238 to its starting position wherein the actuator pin 242 engages the switch element 234 of the wrap material cut-off switch 232 thus switching the latter back to its NC terminal. If the buzzer does not sound a second time shortly after sounding the first time to indicate the beginning of the wrapping operation, this indicates that no wrap has been applied to the bale and that either the supply roll of wrap material is empty or the wrap material has misfed and that the operator should investigate the cause before ejecting the bale. However, if the buzzer 312 remains on together with the red light 306 once the buzzer has come on the second time and the green light is on, this indicates that the surface wrap has not been cut off properly and that the operator should investigate this situation before ejecting the bale. It is here noted that another cause for the buzzer 312 to remain on together with the red light 306 might be that the edge of the blade 211 is holding the wrap material too tightly against the resilient cut-off flap 236 resulting in the spring 244 being unable to return the pivot plate 238 back to its starting position once the surface wrap material has been severed. In this case, adjustment of the bolt forming the blade stop 252 is required to ensure that the blade arm 212 engages the stop 252 before the blade edge produces an excessive holding force on the wrap material.

Once the bale is wrapped either with twine or surface wrap material, the operator will effect discharge of the bale by operating the gate cylinders 104 so as to effect opening of the gate latches (see latch 110 in FIG. 6). This operation results in the opening of each of the series-connected gate latch switches 100 and 102 which places the green light 308 out of circuit so that it goes out. Once the bale is ejected and the gate reclosed, the gate latch switches 100 and 102 will once again be switched to their respective normally open terminals whereby a current path will once again be established to cause the green light 308 to become lit. It will be appreciated that, since the gate latch switches 100 and 102 are connected in series with each other, should either one of the gate latches fail to properly latch, the associated gate latch switch will remain switched to its open position and the green light will remain unlit to warn the operator that the gate is not properly closed and that he should investigate the problem before resuming baling operation.

Thus, it will be appreciated that the indicator circuit 300 together with the means for actuating the microswitches cooperate to permit a minimum of indicator devices to be used to apprise an operator of the operating condition of many of the functions associated with the wrapping of a bale with either twine or surface wrap material.

We claim:

1. In a large round baler having a surface wrap mechanism including a material feed means adapted for feeding a web of surface wrap material along a flight path leading toward a chamber of the baler; means for tensioning a length of said material located along said path during wrapping of a bale; a cut-off blade assembly including a blade and being mounted for movement between a first position at one side of said path, when the blade assembly is in a corresponding cocked position, and second position on an opposite side of said path from said first position, when the blade assembly is in a corresponding cut-off position the blade thus traversing said path for engaging and deflecting the tensioned material toward said second position when said blade assembly is moving toward said cut-off position during severing of the material; a cut-off switch having first and second switch positions and including an actuator means including an element located in a normal position adjacent said path on an opposite side of the path from said one side for being engaged and moved by said tensioned material to actuate the switch from its first to its second position when the wrap material is deflected by said cut-off blade; biasing means connected to said actuator means for moving said element back to its normal position such that the cut-off switch is moved back to its first position once the wrap material has been cut-off and is therefore no longer tensioned; an indicator circuit including a source of electrical current, an indicator light connected in circuit with said cut-off switch means and said source such that a circuit is completed only when said cut-off switch means is in its second position whereby momentary lighting of the indicator light makes an operator aware that the process of cutting off the wrap material has occurred and that the bale is wrapped and ready for discharge.

2. The round baler defined in claim 1 wherein said indicator circuit further includes an electrical responsive audible device connected in parallel with said indicator light and to said cut-off switch whereby a momentary sounding of said audible device occurs when the surface wrap material is cut-off.

3. In a large round baler having a surface wrap mechanism including a pair of feed rolls mounted to and extending between a pair of transversely spaced support frame sidewalls and adapted for feeding wrap material along a flight path extending from the feed rolls toward a bale chamber, means for tensioning the material along said flight path during wrapping of a bale, and a cut-off blade extending between said sidewalls and being mounted for selected movement from a first position located at one side of said flight path to a cut-off position located on an opposite side of the flight path from the first position, an indicator means for indicating when the material has been cut-off comprising: a cut-off switch mounted to an outside surface of one of the sidewalls and including a switch element normally establishing a first switched condition in the switch; switch actuator means pivotally mounted to said outside of said one of the sidewalls for pivoting between a switch-engaging position and a switch releasing position; return spring means coupled to said switch actuator means for resiliently retaining said switch actuator means in its switch-engaging position; said switch actuator means including an actuator element engaging and positioning the switch element for establishing said first switched condition in the switch when the switch actuator means is in its switch-engaging position and for releasing said switch element for permitting the switch to be switched to it second switched condition when the switch actuator means is pivoted to its switch-disengaging position; said actuator element extending inwardly of said one of the sidewalls and being located on an opposite side of said flight path from said cut-off blade when the latter is in its first position; a switch-operating flap being pivotally mounted inside said one of the pair of sidewalls for movement about an axis extending parallel to that about which the switch actuator is mounted to pivot and being disposed between the flight path and said actuator element whereby movement of the cut-off blade from its first to its cut-off position when the flight path is occupied by tensioned surface wrap material results in the wrap material being deflected into contact with the flap which in turn is pivoted and engaged with the actuator element to effect pivoting of the actuator element to its switch-disengaging position to thereby permit the switch to be switched to its second condition only during the time the tensioned wrap material is being deflected by the cut-off blade, the material becoming loose to permit said spring to return the switch actuator means to its switch-engaging position once the material is severed, and indicator circuit means embodying said surface wrap material cut-off switch and including an electrically responsive indicator device which is, energized for giving a signal only when the cut-off switch is in its second switched condition.

* * * * *